(12) United States Patent
Yu et al.

(10) Patent No.: US 9,621,705 B2
(45) Date of Patent: Apr. 11, 2017

(54) METHOD FOR PERFORMING COOPERATIVE FUNCTION AUTOMATICALLY AND DEVICE USING THE SAME

(71) Applicant: Samsung Electronics Co., Ltd., Suwon-si (KR)

(72) Inventors: Seung-dong Yu, Osan-si (KR); Woo-yong Chang, Yongin-si (KR); Se-jun Park, Yongin-si (KR); Min-jeong Moon, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/934,823

(22) Filed: Nov. 6, 2015

(65) Prior Publication Data

US 2016/0062718 A1 Mar. 3, 2016

Related U.S. Application Data

(63) Continuation of application No. 14/638,757, filed on Mar. 4, 2015, which is a continuation of application
(Continued)

(30) Foreign Application Priority Data

Aug. 24, 2009 (KR) .................. 10-2009-0078349

(51) Int. Cl.
*H04M 1/725* (2006.01)
*G06F 13/38* (2006.01)
(Continued)

(52) U.S. Cl.
CPC ...... *H04M 1/72533* (2013.01); *G06F 3/1204* (2013.01); *G06F 3/128* (2013.01);
(Continued)

(58) Field of Classification Search
CPC .................................................. G06F 21/6218
(Continued)

(56) References Cited

U.S. PATENT DOCUMENTS 6,297,805 B1 10/2001 Adler et al.
6,665,717 B1 12/2003 Aizono et al.
(Continued)

FOREIGN PATENT DOCUMENTS

EP 0 798 651 10/1997
EP 0899650 3/1999
(Continued)

OTHER PUBLICATIONS

Russian Office Action dated Apr. 10, 2015 issued in counterpart application No. 2012111311/08.
(Continued)

*Primary Examiner* — Tuan H Nguyen
(74) *Attorney, Agent, or Firm* — Staas & Halsey LLP

(57) ABSTRACT

A device and a method for performing a cooperative function with another device is provided. The device includes a communication unit; and a controller that determines whether the other device is in a surrounding area of the device based a signal received through the communication unit, selects one cooperative function from among a plurality of cooperative functions according to a relative position of the device with respect to the other device and performs the selected cooperative function with the other device. It is determined whether another device is in a surrounding area of a device. When it is determined that the other device is in the surrounding area, the cooperative function is performed by the device with the other device according to a location of the other device. Accordingly, the cooperative function may be performed automatically if devices are in adjacent areas without a user's command.

22 Claims, 15 Drawing Sheets

Related U.S. Application Data

No. 12/862,301, filed on Aug. 24, 2010, now Pat. No. 8,995,913.

(51) Int. Cl.
*H04W 4/00* (2009.01)
*G06F 3/12* (2006.01)
*G06K 15/00* (2006.01)
*H04W 4/04* (2009.01)

(52) U.S. Cl.
CPC .......... *G06F 3/1236* (2013.01); *G06F 3/1292* (2013.01); *G06F 13/385* (2013.01); *G06K 15/007* (2013.01); *H04W 4/008* (2013.01); *H04W 4/04* (2013.01)

(58) Field of Classification Search
USPC .... 455/41.1, 41.2, 404.2, 412.1, 420, 426.2, 455/456.1; 370/259, 338, 354; 340/572.1; 709/201, 213, 221, 223, 224
See application file for complete search history.

(56) References Cited

U.S. PATENT DOCUMENTS

| | | | |
|---|---|---|---|
| 6,985,589 | B2 | 1/2006 | Morley et al. |
| 7,228,137 | B2 | 6/2007 | Chinomi et al. |
| 7,933,054 | B2* | 4/2011 | Fujioka .................... H04N 1/60 358/1.17 |
| 8,086,214 | B2 | 12/2011 | Naruse |
| 8,154,472 | B2 | 4/2012 | Yamaguchi et al. |
| 8,995,913 | B2 | 3/2015 | Yu et al. |
| 2002/0196125 | A1 | 12/2002 | Yu et al. |
| 2003/0206635 | A1 | 11/2003 | Morley et al. |
| 2005/0090294 | A1 | 4/2005 | Narasimhan |
| 2005/0135619 | A1 | 6/2005 | Morley et al. |
| 2005/0276575 | A1 | 12/2005 | Murayama et al. |
| 2007/0273609 | A1 | 11/2007 | Yamaguchi et al. |
| 2008/0005767 | A1 | 1/2008 | Seo |
| 2008/0084577 | A1 | 4/2008 | Mihira |
| 2008/0209011 | A1 | 8/2008 | Stremel et al. |
| 2008/0320094 | A1 | 12/2008 | Tu et al. |
| 2009/0137256 | A1* | 5/2009 | Karaoguz ............. G01S 13/878 455/456.6 |
| 2009/0253372 | A1 | 10/2009 | Naruse |
| 2009/0254602 | A1 | 10/2009 | Yoshida |
| 2009/0254980 | A1 | 10/2009 | Kanaparti |
| 2010/0250794 | A1 | 9/2010 | Hanks et al. |
| 2012/0127168 | A1 | 5/2012 | Yamaguchi et al. |
| 2013/0184002 | A1 | 7/2013 | Moshfeghi |

FOREIGN PATENT DOCUMENTS

| | | |
|---|---|---|
| EP | 1109367 | 6/2001 |
| JP | 11-143606 | 5/1999 |
| JP | 2001-167019 | 6/2001 |
| JP | 2005-354312 | 12/2005 |
| JP | 2006-092332 | 4/2006 |
| JP | 2007-259288 | 10/2007 |
| JP | 2008-003574 | 1/2008 |
| JP | 2009-253476 | 10/2009 |
| JP | 2010-011054 | 1/2010 |
| KR | 1020080005840 | 1/2008 |
| KR | 1020090011298 | 2/2009 |
| RU | 2257015 | 7/2005 |
| WO | 2005/004415 | 1/2005 |
| WO | 2008/085844 | 7/2008 |

OTHER PUBLICATIONS

Chinese Office Action dated May 6, 2015 issued in counterpart Appln. No. 201010260479.4.
Notice of Acceptance Office Action dated Jul. 10, 2015 issued in counterpart application No. 2010287253, 3 pages.
Korean Office Action dated Sep. 16, 2015 issued in counterpart Appln. No. 10-2009-0078349, 7 pages.
Australian Examination Report dated Feb. 12, 2015 issued in counterpart application No. 2010287253.
European Search Report dated Oct. 21, 2014 issued in counterpart application No. 10173898.7-1954.
Australian Examination Report dated Oct. 24, 2014 issued in counterpart application No. 2010287253.
Chinese Office Action dated Dec. 1, 2014 issued in counterpart application No. 201010260479.4.
Russian Office Action dated Dec. 4, 2014 issued in counterpart application No. 2012111311/08.
Japanese Office Action dated Jun. 12, 2014 issued in counterpart Appln. No. 2010-187070.
Chinese Office Action dated Jul. 3, 2014 issued in counterpart Appln. No. 201010260479.4.
US Office Action issued Oct. 6, 2015 in U.S. Appl. No. 14/638,757.
US Office Action issued Jun. 16, 2015 in U.S. Appl. No. 14/638,757.
US Notice of Allowance issued Nov. 18, 2014 in U.S. Appl. No. 12/862,301.
US Notice of Allowance issued Jul. 10, 2014 in U.S. Appl. No. 12/862,301.
US Notice of Allowance issued Feb. 10, 2014 in U.S. Appl. No. 12/862,301.
US Office Action issued Sep. 23, 2013 in U.S. Appl. No. 12/862,301.
US Office Action issued Dec. 27, 2012 in U.S. Appl. No. 12/862,301.
US Office Action issued Aug. 1, 2012 in U.S. Appl. No. 12/862,301.
U.S. Appl. No. 14/638,757, filed Mar. 4, 2015, Seung-dong Yu, et al. Samsung Electronics Co., Ltd.
US Notice of Allowance issued Dec. 29, 2015 in copending U.S. Appl. No. 14/638,757.
Chinese Office Action dated Dec. 11, 2015 in Chinese Patent Application No. 201010260479.4.
Extended European Search Report dated Feb. 2, 2016 in European Patent Application No. 15189839.2.
Japanese Office Action dated May 23, 2016 in Japanese Patent Application No. 2015-094941.
Japanese Office Action dated Jan. 10, 2017 in Japanese Patent Application No. 2015-094941.
Australian Examination Report dated Feb. 14, 2017 in Australian Patent Application No. 2015246151.

\* cited by examiner

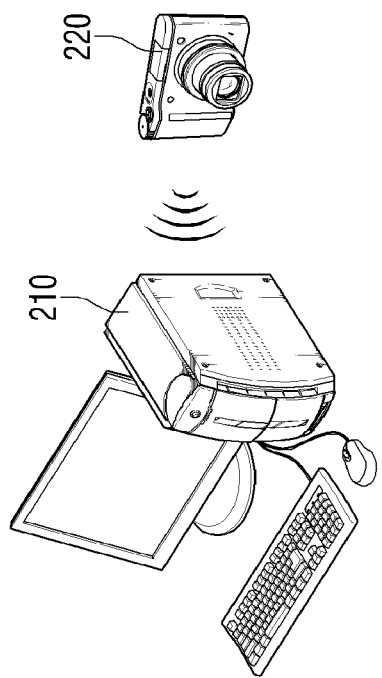
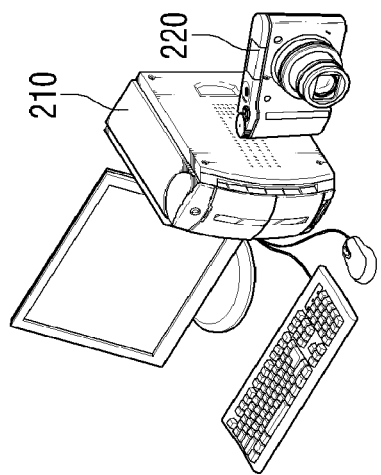

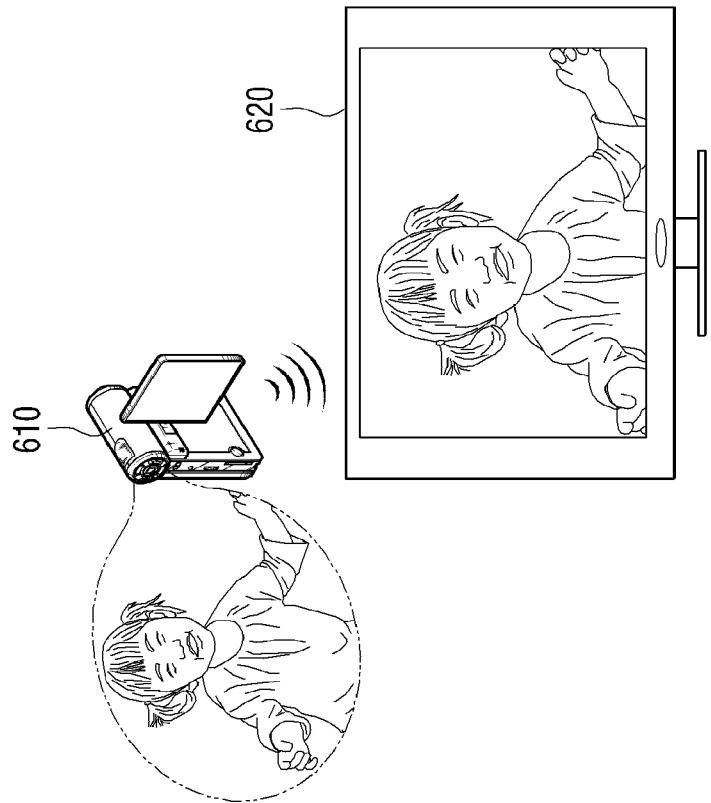
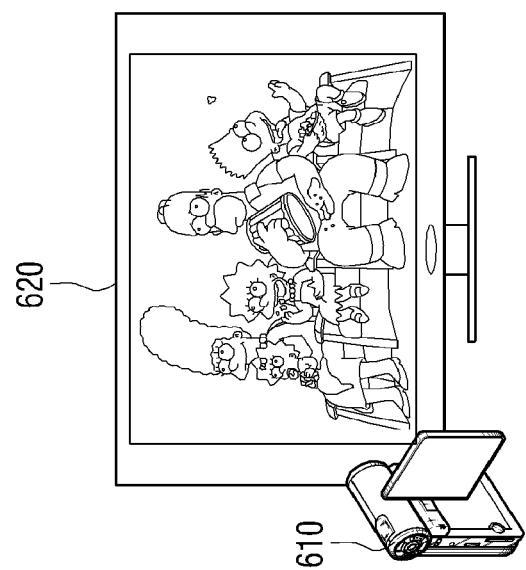

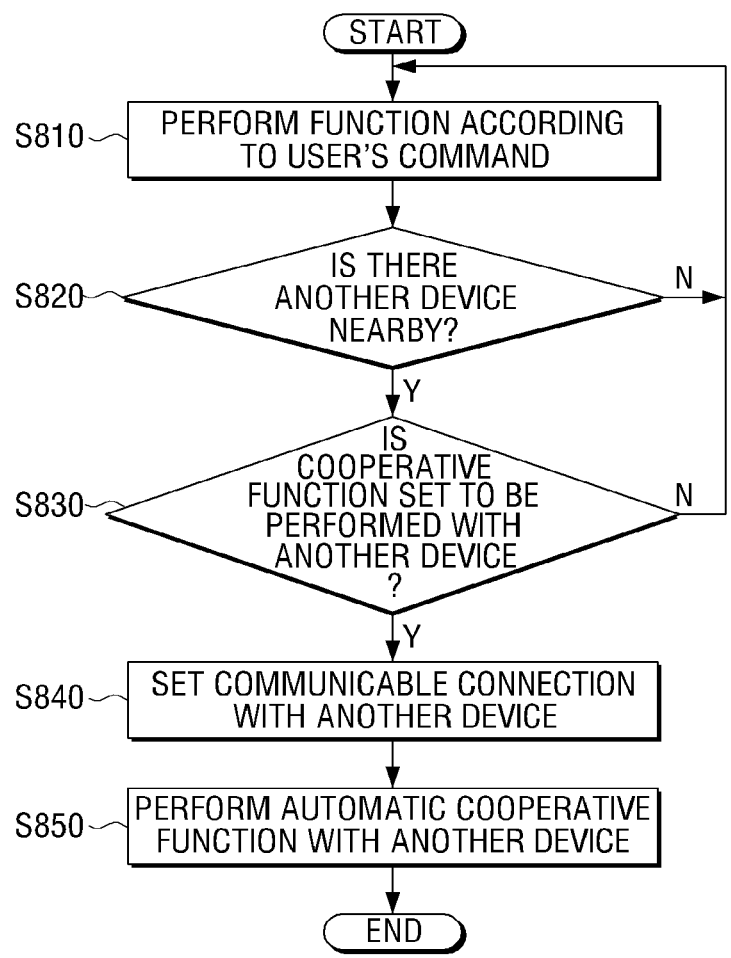

METHOD FOR PERFORMING COOPERATIVE FUNCTION AUTOMATICALLY AND DEVICE USING THE SAME

CROSS-REFERENCE TO RELATED APPLICATIONS

This application is a continuation of U.S. patent application Ser. No. 14/638,757, filed Mar. 4, 2015, which is a continuation of U.S. patent application Ser. No. 12/862,301, filed Aug. 24, 2010, and claims priority under 35 U.S.C. §119(a) to Korean Patent Application No. 10-2009-0078349, filed Aug. 24, 2009, in the Korean Intellectual Property Office, the disclosures of which are incorporated herein by reference.

BACKGROUND

1. Field

The present invention relates generally to a method for performing a cooperative function and a device using the same, and more particularly, to a method for allowing a plurality of devices to perform a single cooperative function together, and a device using the same.

2. Description of the Related Art

With the advent of various digital devices, the number of digital devices that a single user possesses has increased significantly.

These various digital devices have provided increased convenience, and continue to become more sophisticated by incorporating multi-functions.

The user, however, still pursues digital devices having more advanced and sophisticated functions.

However, a digital device is limited in the number of functions it can perform on its own. Therefore, a method for converging and combining each device owned by the user is required to create a new function which can be performed by a plurality of digital devices.

SUMMARY

The present invention has been made to address at least the above problems and/or disadvantages and to provide at least the advantages described below. Accordingly, an aspect of the present invention provides a method for performing a cooperative function if it is determined that there are other devices in the surrounding area, and a device using the same.

According to an aspect of the present invention, a device for performing a cooperative function with another device is provided. The device includes a communication unit; and a controller that determines whether the other device is in a surrounding area of the device based a signal received through the communication unit, selects one cooperative function from among a plurality of cooperative functions according to a relative position of the device with respect to the other device and performs the selected cooperative function with the other device.

BRIEF DESCRIPTION OF THE DRAWINGS

The above and other aspects, features and advantages of the present invention will be more apparent from the following detailed description when taken in conjunction with the accompanying drawings, in which:

FIGS. 1A to 7B are diagrams illustrating a concept of performing a cooperative function automatically by devices in adjacent areas, according to embodiments of the present invention;

FIG. 8 is a flowchart illustrating a method for performing a cooperative function automatically among devices in adjacent areas, according to an embodiment of the present invention;

DETAILED DESCRIPTION

Figure 1A:
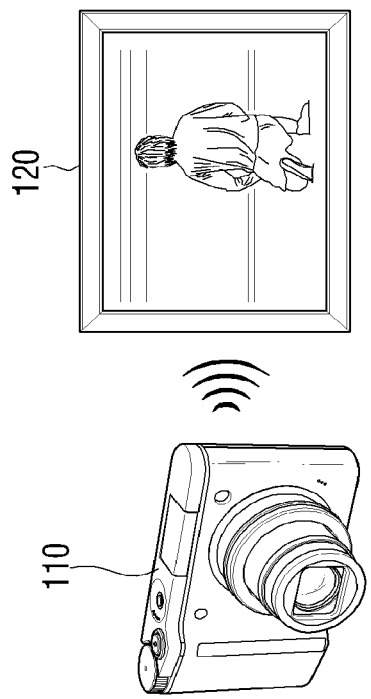

Embodiments of the present invention are described in detail with reference to the accompanying drawings.

In the following description, the same or similar reference numerals may be used for the same or similar elements when they are illustrated in different drawings. Detailed descriptions of constructions or processes known in the art may be omitted to avoid obscuring the subject matter of the present invention.

Figure 1B:
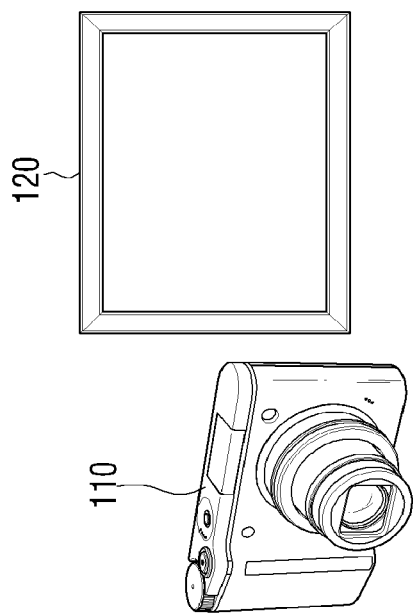

FIGS. 1A and 1B are diagrams illustrating a method for performing a cooperative function automatically according to a first embodiment of the present invention. FIG. 1A illustrates that a digital camera 110 is adjacent to an electronic frame 120 (within a predetermined distance).

If the digital camera 110 is adjacent to the electronic frame 120 as illustrated in FIG. 1A, a cooperative function is automatically performed by the digital camera 110 and the electronic frame 120 as illustrated in FIG. 1B.

FIG. 1B illustrates that the digital camera 110 transmits stored photos to the electronic frame 120, and the electronic frame 120 reproduces the photos received from the digital camera 110 as a slideshow.

In order to perform the above cooperative function, the digital camera 110 is preset to transmit stored photos to the electronic frame 120 if the digital camera 110 is adjacent to the electronic frame 120.

In addition, in order to perform the above cooperative function, the electronic frame 120 is preset to reproduce the photos received from the digital camera 110 as a slideshow if the electronic frame 120 is adjacent to the digital camera 110.

Once the cooperative function starts between the digital camera 110 and the electronic frame 120, the cooperative function continues even if the distance between the two becomes wide.

FIGS. 2A and 2B are diagrams illustrating a method for performing a cooperative function automatically, according to a second embodiment of the present invention. FIG. 2A illustrates that a digital camera 220 is adjacent to a Personal Computer (PC) 210.

If the digital camera 220 is adjacent to the PC 210 as illustrated in FIG. 2A, a cooperative function is automatically performed by the digital camera 220 and the PC 210, as illustrated in FIG. 2B.

FIG. 2B illustrates that the digital camera 220 transmits additionally stored photos to the PC 210, and the PC 210 backs-up the photos received from the digital camera 220 in a designated folder of the Hard Disk Drive (HDD).

In order to perform the above cooperative function, the digital camera 220 is preset to transmit additionally stored photos to the PC 210 if the digital camera 220 is adjacent to the PC 210.

In addition, in order to perform the above cooperative function, the PC 210 is preset to back-up the photos received from the digital camera 220 in a designated folder of the HDD if the PC 210 is adjacent to the digital camera 220.

Once the cooperative function starts between the PC 210 and the digital camera 220, the cooperative function continues even if the distance between the two becomes wide.

Figure 3B:
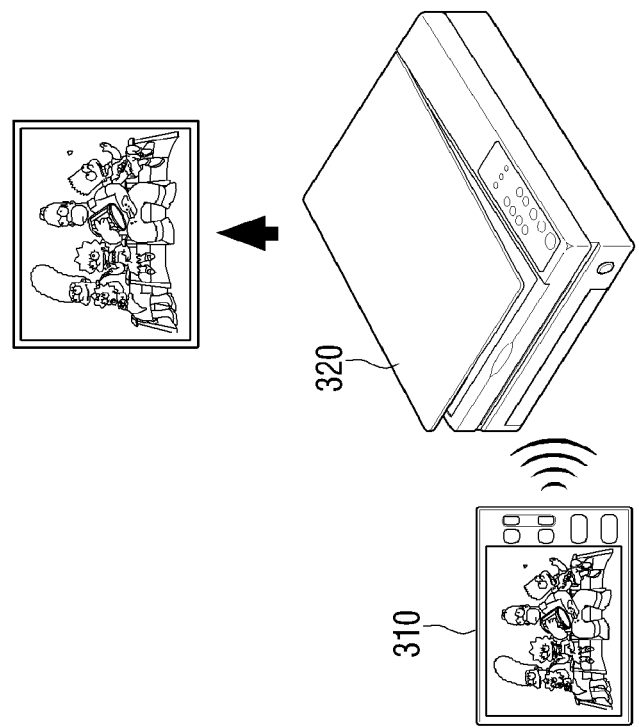
Figure 3A:
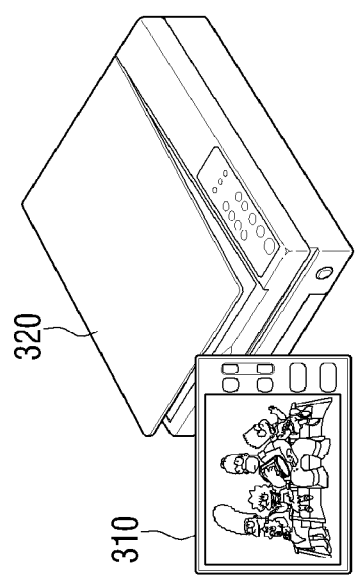

FIGS. 3A and 3B are diagrams illustrating a method for performing a cooperative function automatically, according to a third embodiment of the present invention. FIG. 3A illustrates that a digital camera 310, which is reproducing photos, is adjacent to a printer 320.

If the digital camera 310 is adjacent to the printer 320 as illustrated in FIG. 3A, a cooperative function is automatically performed by the digital camera 310 and the printer 320, as illustrated in FIG. 3B.

FIG. 3B illustrates that the digital camera 310 transmits photos which are being reproduced to the printer 320, and the printer 320 prints the photos received from the digital camera 310.

In order to perform the above cooperative function, the digital camera 310 is preset to transmit photos that are currently being reproduced to the printer 320 if the digital camera 310 is adjacent to the printer 320.

In addition, in order to perform the above cooperative function, the printer 320 is preset to print the photos received from the digital camera 310 if the printer 320 is adjacent to the digital camera 310.

If an MP3 player, which is reproducing music, is adjacent to the printer 320, the MP3 player transmits information regarding the current music to the printer 320 and the printer 320 may download the lyrics or music book of the current music through the Internet and print them.

Figure 4B:
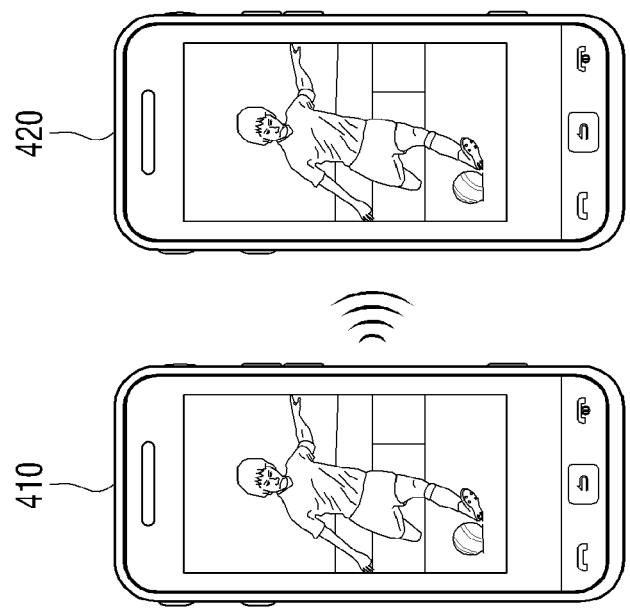
Figure 4A:
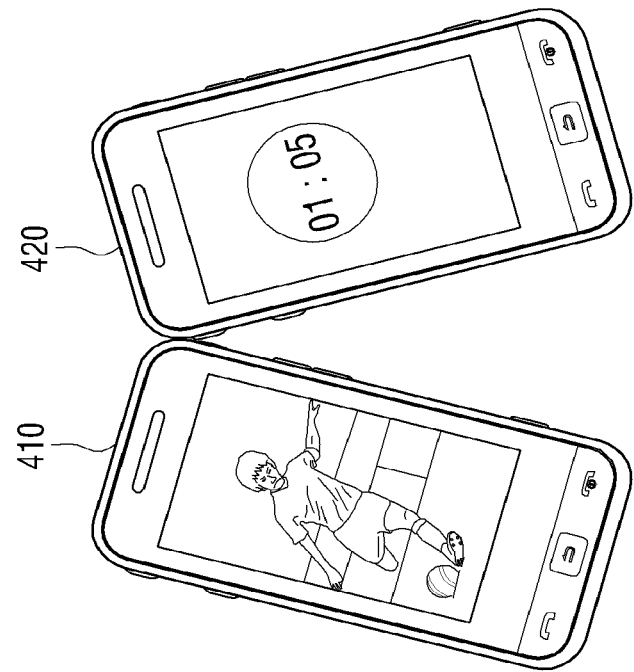

FIGS. 4A and 4B are diagrams illustrating a method for performing a cooperative function automatically, according to a fourth embodiment of the present invention. FIG. 4A illustrates that a mobile phone-A 410, which is reproducing photos, is adjacent to a mobile phone-B 420, which is in a standby mode.

If the mobile phone-A 410 is adjacent to the mobile phone-B 420 as illustrated in FIG. 4A, a cooperative function is automatically performed by the mobile phone-A 410 and the mobile phone-B 420, as illustrated in FIG. 4B.

FIG. 4B illustrates that the mobile phone-A 410 transmits photos, which are currently being reproduced, to the mobile phone-B 420, and the mobile phone-B 420 changes its mode from a standby mode to a photo play mode, and displays the photos received from the mobile phone 410 on a screen.

In order to perform the above cooperative function, the mobile phone-A 410 is preset to transmit photos, which are currently being reproduced to the mobile phone-B 420, if the mobile phone-A 410 is adjacent to the mobile phone-B 420.

In addition, in order to perform the above cooperative function, the mobile phone 420 is preset to display the photos received from the mobile phone-A 410 if the mobile phone 420-B is adjacent to the mobile phone-A 410.

Once the cooperative function starts between the mobile phone-A 410 and the mobile phone-B 420, the cooperative function continues even if the distance between the two becomes wide.

Figure 5B:
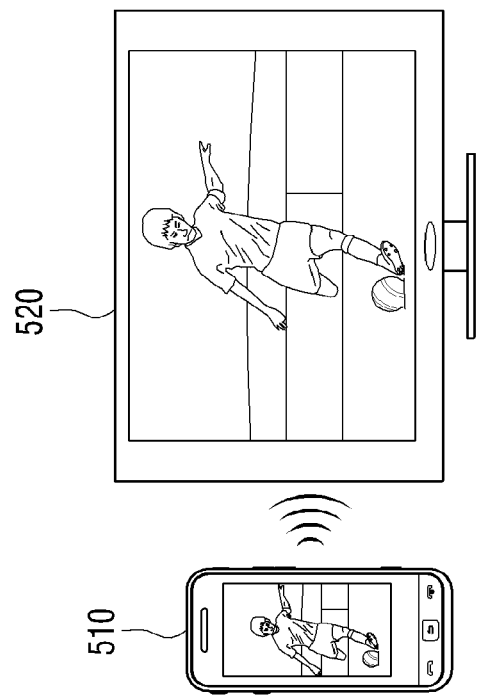
Figure 5A:
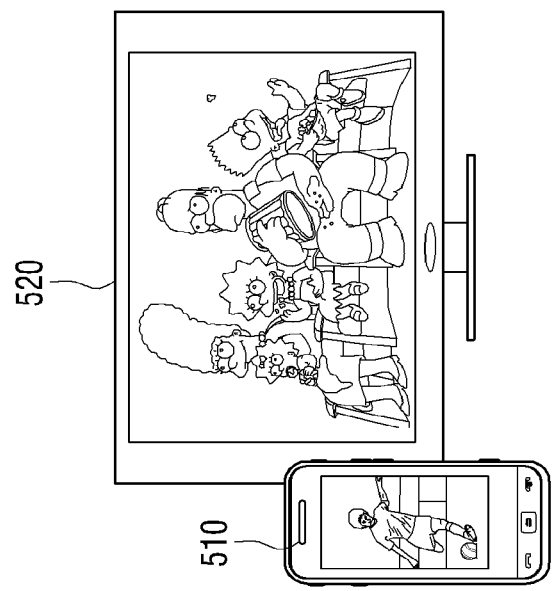

FIGS. 5A and 5B are diagrams illustrating a method for performing a cooperative function automatically, according to a fifth embodiment of the present invention. FIG. 5A illustrates that a mobile phone-A 510, which is reproducing photos, is adjacent to a television (TV) 520, which is reproducing broadcast.

If the mobile phone 510 is adjacent to the TV 520 as illustrated in FIG. 5A, a cooperative function is automatically performed by the mobile phone 510 and the TV 520, as illustrated in FIG. 5B.

FIG. 5B illustrates that the mobile phone 510 transmits photos, which are currently being reproduced, to the TV 520, and the TV 520 stops reproducing broadcast and reproduces the photos received from the mobile phone 510.

In order to perform the above cooperative function, the mobile phone 510 is preset to transmit photos, which are currently being reproduced, to the TV 520 if the mobile phone 510 is adjacent to the TV 520.

In addition, in order to perform the above cooperative function, the TV 520 is preset to reproduce the photos received from the mobile phone 510 if the TV 520 is adjacent to the mobile phone 510.

Once the cooperative function starts between the mobile phone 510 and the TV 520, the cooperative function continues even if the distance between the two becomes wide.

FIGS. 6A and 6B are diagrams illustrating a method for performing a cooperative function automatically, according to a sixth embodiment of the present invention. FIG. 6A illustrates that a digital camcorder 610 is adjacent to a TV 620, which is reproducing broadcast.

If the digital camcorder 610 is adjacent to the TV 620 as illustrated in FIG. 6A, a cooperative function is automatically performed by the digital camcorder 610 and the TV 620, as illustrated in FIG. 6B.

FIG. 6B illustrates that the digital camcorder 610 transmits images currently being photographed to the TV 620, and the TV 620 stops reproducing broadcast and reproduces the images received from the digital camcorder 610.

In order to perform the above cooperative function, the digital camcorder 610 is preset to transmit images, which are currently being photographed, to the TV 620 if the digital camcorder 610 is adjacent to the TV 620.

In addition, in order to perform the above cooperative function, the TV 620 is preset to reproduce the images received from digital camcorder 610 if the TV 620 is adjacent to the digital camcorder 610.

Once the cooperative function starts between the digital camcorder 610 and the TV 620, the cooperative function continues even if the distance between the two becomes wide.

Figure 7A:
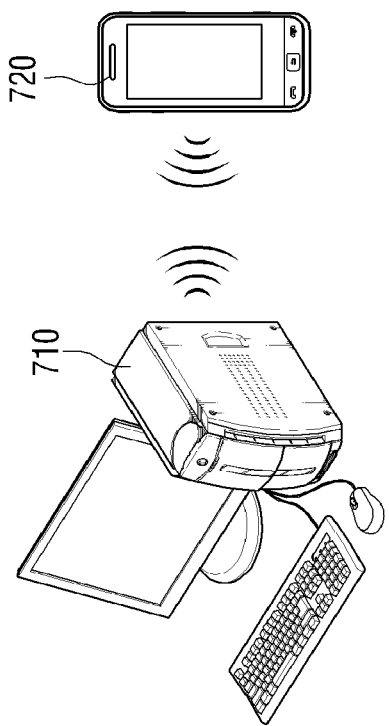
Figure 7B:
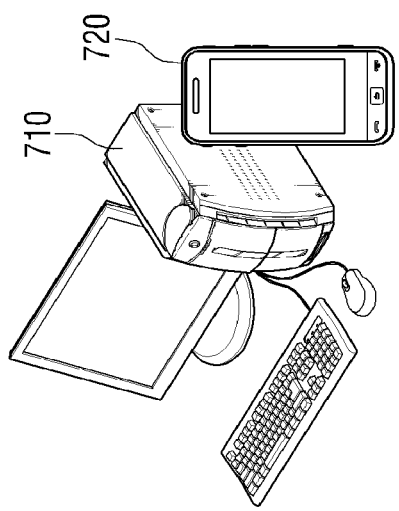

FIGS. 7A and 7B are diagrams illustrating a method for performing a cooperative function automatically, according to a seventh embodiment of the present invention. FIG. 7A illustrates that a mobile phone 720 is adjacent to a PC 710.

If the mobile phone 720 is adjacent to the PC 710 as illustrated in FIG. 7A, a cooperative function is automatically performed by the mobile phone 720 and the PC 710 as illustrated in FIG. 7B.

FIG. 7B illustrates that the mobile phone 720 transmits stored schedule information to the PC 710, and the PC 710 backs-up the schedule information received from the mobile phone 720 in a designated folder.

In order to perform the above cooperative function, the mobile phone 720 is preset to transmit stored schedule information to the PC 710 if the mobile phone 720 is adjacent to the PC 710.

In addition, in order to perform the above cooperative function, the PC 710 is preset to back-up the schedule information received from the mobile phone 720 in a designated folder if the PC 710 is adjacent to the mobile phone 720.

Once the cooperative function starts between the mobile phone 720 and the PC 710, the cooperative function continues even if the distance between the two becomes wide.

FIG. 8 is a flowchart illustrating a method for performing a cooperative function automatically among devices in adjacent areas, according to an embodiment of the present invention.

As illustrated in FIG. 8, a device performs a function according to a user's command in step S810, and determines whether there is another device in surrounding areas in step S820.

If it is determined that there is another device nearby in step S820, the device determines whether an automatic cooperative function is set between the device and the other device in step S830.

If it is determined that an automatic cooperative function is set in step S830, the device sets a communicable connection with the other device in step S840.

Subsequently, the device performs the cooperative function with the other device automatically in step S850.

Figure 9A:
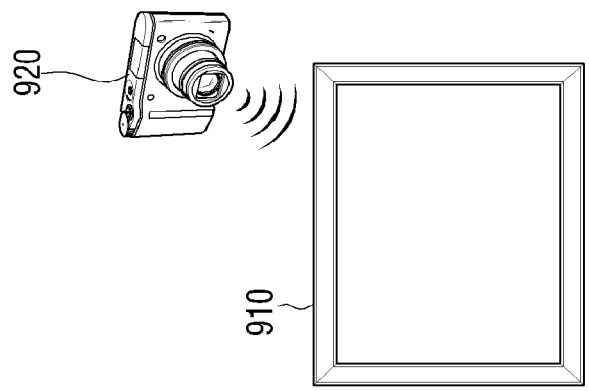
FIGS. 9A to 10B are diagrams illustrating a concept of performing a cooperative function automatically which is set in advance considering locations of devices in adjacent areas, according to an embodiment of the present invention.

FIGS. 9A and 9B and FIGS. 10A and 10B are diagrams illustrating a method for performing a cooperative function automatically, according to an eighth embodiment of the present invention. FIG. 9A illustrates that a digital camera 920 is adjacent to the 'back' of an electronic frame 910.

Figure 9B:
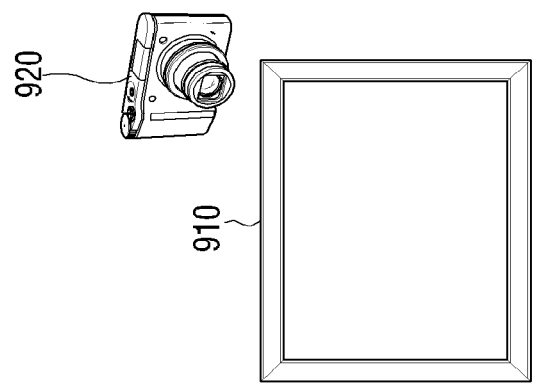

If the digital camera 920 is adjacent to the back of the electronic frame 910 as illustrated in FIG. 9A, a cooperative function is automatically performed by the digital camera 920 and the electronic frame 910 as illustrated in FIG. 9B.

FIG. 9B illustrates that the digital camera 920 transmits stored photos to the electronic frame 910, and the electronic frame 910 backs-up the photos received from the digital camera 920 in its own storage medium.

In order to perform the above cooperative function, the digital camera 920 is preset to transmit stored photos to the electronic frame 910 if the digital camera 920 is adjacent to the back of the electronic frame 910.

In addition, in order to perform the above cooperative function, the electronic frame 910 is preset to back-up the photos received from the digital camera 920 if the back of electronic frame 910 is adjacent to the digital camera 920.

Once the cooperative function starts between the digital camera 920 and the electronic frame 910, the cooperative function continues even if the distance between the two becomes wide.

Figure 10B:
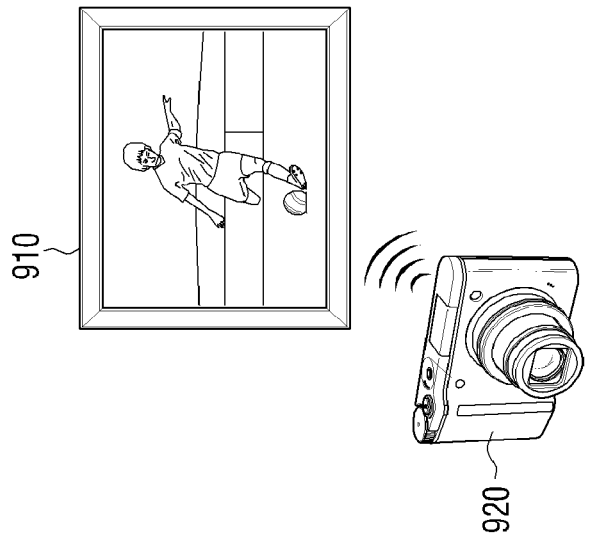
Figure 10A:
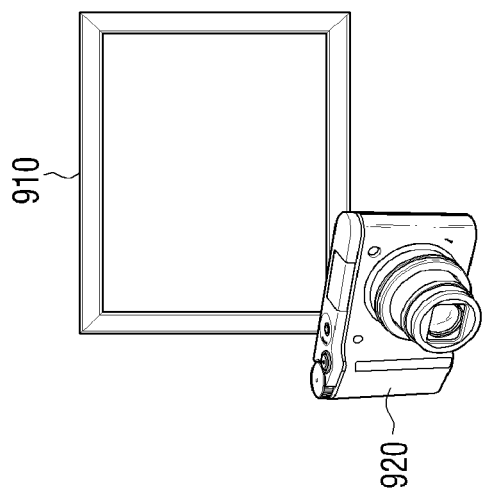

FIG. 10A illustrates that the digital camera 920 is adjacent to the 'front' of the electronic frame 910.

If the digital camera 920 is adjacent to the front of the electronic frame 910 as illustrated in FIG. 10A, a cooperative function is automatically performed by the digital camera 920 and the electronic frame 910 as illustrated in FIG. 10B.

FIG. 10B illustrates that the digital camera 920 transmits stored photos to the electronic frame 910, and the electronic frame 910 reproduces the photos received from the digital camera 920 as a slideshow.

In order to perform the above cooperative function, the digital camera 920 is preset to transmit stored photos to the electronic frame 910 if the digital camera 920 is adjacent to the front of the electronic frame 910.

In addition, in order to perform the above cooperative function, the electronic frame 910 is preset to reproduce the photos received from the digital camera 920 as a slideshow if the front of electronic frame 910 is adjacent to the digital camera 920.

Once the cooperative function starts between the digital camera 920 and the electronic frame 910, the cooperative function continues even if the distance between the two becomes wide.

Figure 11:
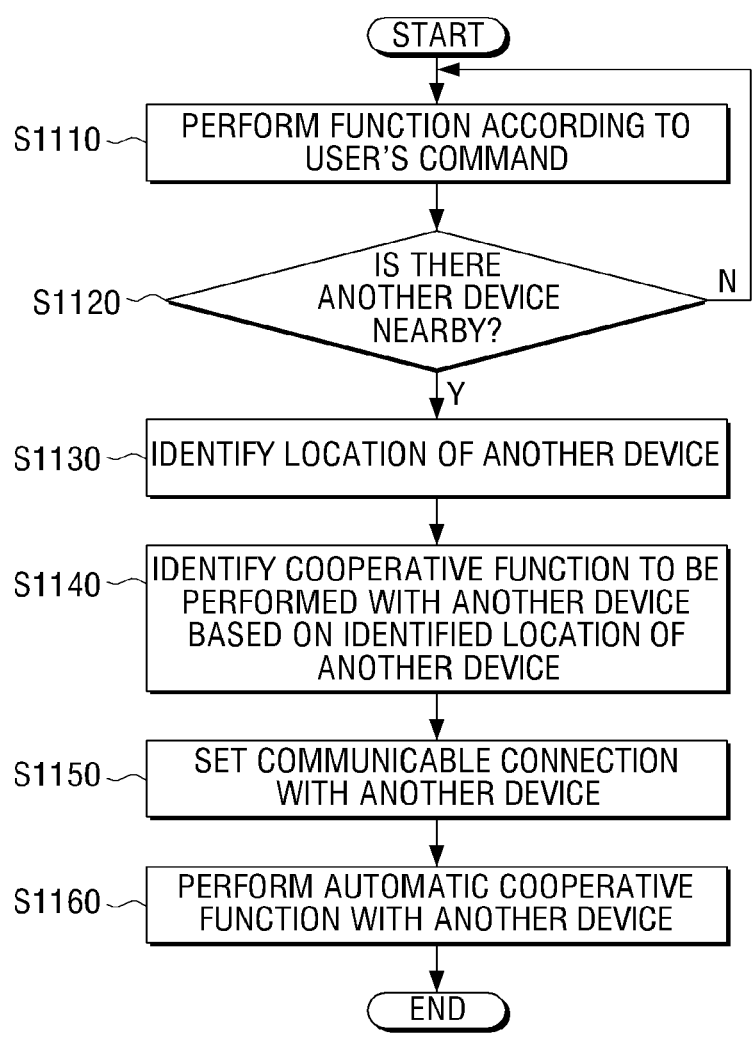
FIG. 11 is a flowchart illustrating a method for performing different cooperative functions automatically considering locations of devices in adjacent areas, according to an embodiment of the present invention.

FIG. 11 is a flowchart illustrating a method for performing different cooperative functions automatically considering locations of devices in adjacent areas, according to an embodiment of the present invention.

As illustrated in FIG. 11, a device performs a function according to a user's command in step S1110 and determines whether there is another device in surrounding areas in step S1120.

If it is determined that there is another device nearby in step S1120, the device identifies the location of the other device in step S1130.

Subsequently, the device identifies an automatic cooperative function that should be performed together with the other device based on the location of the other device in step S1140.

The device sets a communicable connection with the other device in step S1150. Subsequently, the device performs the cooperative function with the other device automatically in step S1160.

FIGS. 12A and 12B, FIGS. 13A and 13B, and FIGS. 14A and 14B are diagrams illustrating a method for performing a cooperative function automatically, according to a ninth embodiment of the present invention.

Figure 12A:
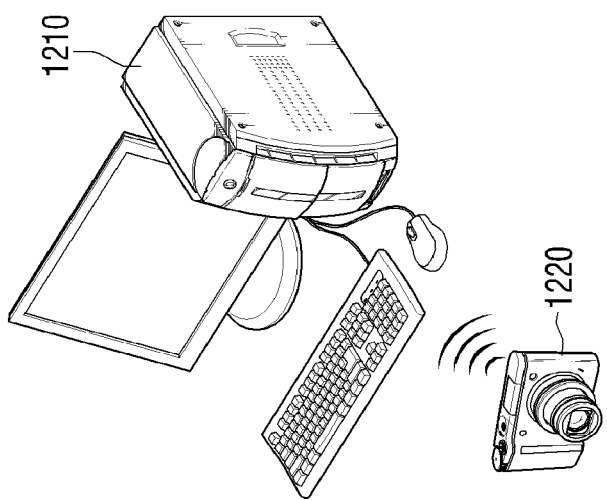
FIGS. 12A to 14B are diagrams illustrating a method for performing different cooperative functions automatically according to locations of devices in adjacent areas, according to an embodiment of the present invention.
Figure 12B:
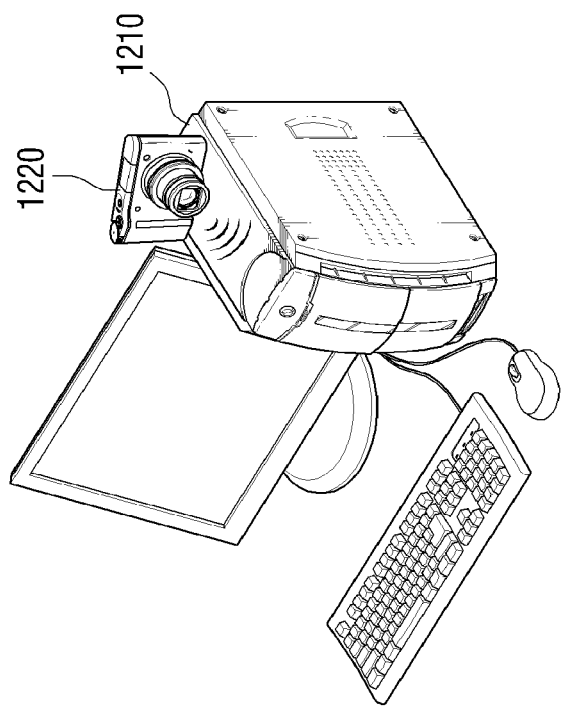

FIG. 12A illustrates that a digital camera 1220 is located on the main body of a PC 1210, and FIG. 12B illustrates that the digital camera 1220 is located in front of the main body of the 1210.

As illustrated in FIG. 12A, if the digital camera 1220 is located on the main body of the PC 1210, the digital camera 1220 may transmit stored photos to the PC 1210 and the PC 1210 may back-up the photos received from the digital camera 1220 in its own storage medium as a cooperative function is automatically performed by the digital camera 1220 and the PC 1210.

As illustrated in FIG. 12B, if the digital camera 1220 is located in front of the main body of the PC 1210, the digital camera 1220 may transmit stored photos to the PC 1210 and the PC 1210 may reproduce the photos received from the digital camera 1220 as a slideshow as a cooperative function is automatically performed by the digital camera 1220 and the PC 1210.

Figure 13B:
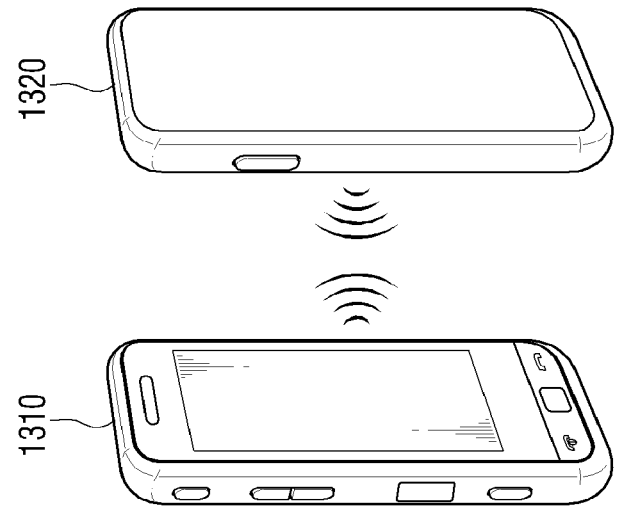
Figure 13A:
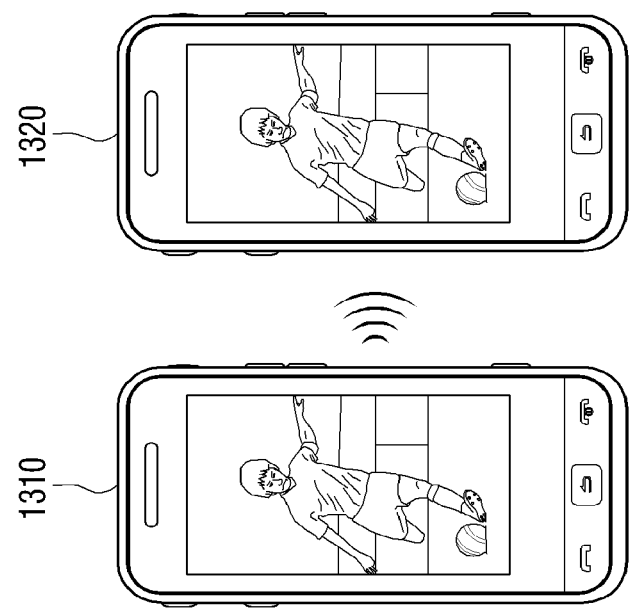

As illustrated in FIG. 13A, if the liquid crystal of a mobile phone-A 1310 and the liquid crystal of a mobile phone-B 1320 are placed side by side facing an upper or lower direction, the address book stored in the mobile phone-A 1310 may be synchronized with the address book stored in the mobile phone-B 1320 as a cooperative function is automatically performed by the mobile phone-A 1310 and the mobile phone-B 1320.

As illustrated in FIG. 13B, if the mobile phone-A 1310 and the mobile phone-B 1320 face each other, the photos stored in the mobile phone-A 1310 may be synchronized with the photos stored in the mobile phone-B 1320 as a cooperative function is automatically performed by the mobile phone-A 1310 and the mobile phone-B 1320.

Figure 14B:
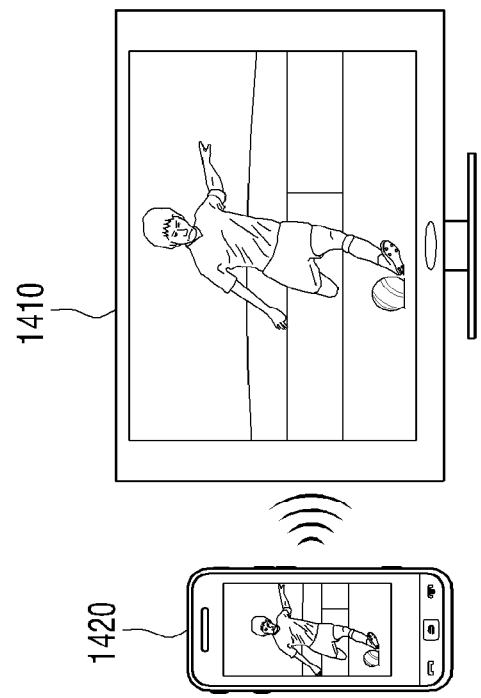
Figure 14A:
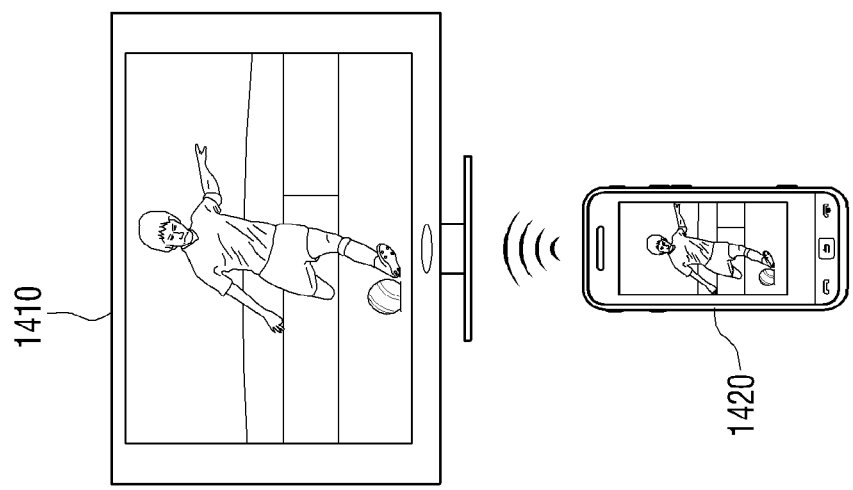

As illustrated in FIG. 14A, if a mobile phone 1420 is located in front of a TV 1410, the mobile phone 1420 may transmit stored photos to the TV 1410, and the TV 1410 may reproduce the photos received from the mobile phone 1420 as a slideshow as a cooperative function is automatically performed by the mobile phone 1420 and the TV 1410.

In addition, as illustrated in FIG. 14B, if the mobile phone 1420 is located next to the TV 1410, the contents stored in the mobile phone 1420 may be synchronized with the contents stored in the hard-disk of the TV 1410 or the contents stored in the USB connected to the TV.

In the above embodiments, a cooperative function is automatically performed when two devices become close to each other, but this is only an example. A cooperative function may also be automatically performed when two devices are in contact with each other.

In this case, the type of cooperative function to be performed may be determined depending on which part of a device is contacted by another device. For example, if the device is in contact with the "front" of another device, "a first" cooperative function may be performed, and if the device is in contact with the "back" of another device, "a second" cooperative function may be performed.

To sense which part of the device in contact with another device, sensors should be formed on the surface of the other device.

In addition, the type of cooperative function to be performed may be determined depending on which part of a device contacts which part of another device. For example, if the "front" of the device contacts the "front" of another device, "the first" cooperative function may be performed, and if the "back" of the device contacts the "back" of another device, "the second" cooperative function may be performed.

The type of cooperative function performed by devices may be determined by a user. In addition, the type of cooperative function that is already set may be changed by a user.

A cooperative function may be automatically set according to the properties of a device. For example, since the properties of a camera include taking pictures and the properties of a printer includes printing, a cooperative function may be automatically set as the camera taking pictures and the printer printing the photographed pictures.

The devices mentioned in the above embodiments are only examples. The technical feature of the present invention may be applied to other devices.

Figure 15:
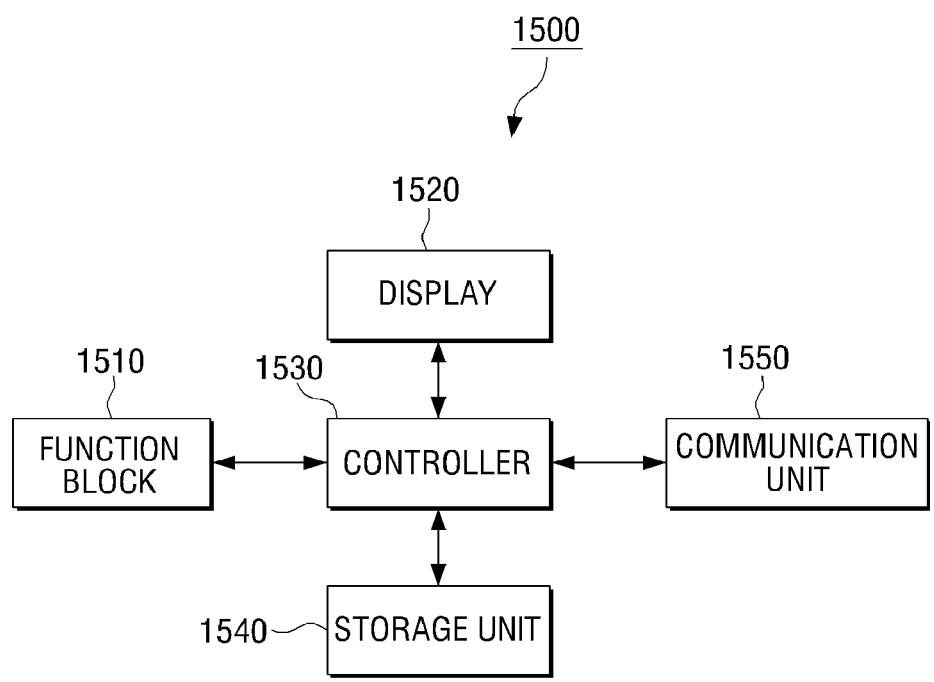
FIG. 15 is a block diagram of a device, according to an embodiment of the present invention.

FIG. 15 is a block diagram of a device to which the present invention is applicable. The device includes a function block 1510, a display 1520, a controller 1530, a storage unit 1540 and a communication unit 1550.

The function block 1510 performs an original function of the device. If the device is a mobile phone, the function block performs telephone communication and SMS, and if the device is a TV, the function block 1510 performs broadcast reception and reproduction.

The display 1520 displays the performance result of the function block 1510 and the GUI.

The storage unit 1540 is a storage medium to store programs necessary to perform the function of the function block 1510 and to provide the GUI, contents, and other data.

The communication unit 1550 senses whether another device approaches a device in surrounding areas, and sets a communicable connection between the device and a sensed device.

In addition, the communication unit 1550 senses the location of another device in surrounding areas. For example, the communication unit 1550 senses from which sides among front, back, left and right another device approaches. To do so, the communication unit 1550 may use a plurality of directional antennas and a plurality of directional sensors.

Meanwhile, the communication unit 1550 may have a bi-directional wireless communication module to sense the location of other devices in surrounding areas. In this case, there is no limitation to the method of wireless communication of the bi-directional wireless communication module. Therefore, the wireless communication may be realized as infrared communication, sound wave communication, an RF communication, or wireless network communication.

The controller 1530 controls the device to perform a cooperative function with another device through the process illustrated in FIGS. 8 and 11.

While the invention has been shown and described with reference to certain embodiments thereof, it will be understood by those skilled in the art that various changes in form and detail may be made therein without departing from the spirit and scope of the invention, as defined by the appended claims.

What is claimed is:

1. A printer comprising:
a memory configured to store instructions; and
a processor configured to execute the instructions stored in the memory to cause the printer to:
establish, based on the printer detecting a mobile apparatus, a wireless connection between the printer and the mobile apparatus,
receive content displayed on the mobile apparatus from the mobile apparatus without a user command to print the content displayed input to the mobile apparatus after the wireless connection between the printer and the mobile apparatus is established, and
print the content received from the mobile apparatus.

2. The printer of claim 1, wherein the content is at least one of an image, a picture, a photo, information regarding music being played, schedule information, and address book information.

3. The printer of claim 1, wherein the content is displayed full-screen on the mobile apparatus.

4. The printer of claim 1, wherein the printing the content received from the mobile apparatus includes printing based on an orientation of the mobile apparatus relative to the printer.

5. The printer of claim 1, wherein the printing the content received from the mobile apparatus includes printing based on a function determined by a location of the mobile apparatus relative to the printer.

6. A printer comprising:
a memory configured to store instructions; and
a processor configured to execute the instructions stored in the memory to cause the printer to:
establish, based on the printer detecting a mobile apparatus, a wireless connection between the printer and the mobile apparatus,
automatically receive content displayed on the mobile apparatus from the mobile apparatus, and
automatically print the content received from the mobile apparatus.

7. The printer of claim 6, wherein the content displayed on the mobile apparatus is automatically received from the mobile apparatus and the content received from the mobile apparatus is automatically printed without a user command to print the content displayed input to the mobile apparatus after the wireless connection between the printer and the mobile apparatus is established.

8. A method comprising:
   establishing a wireless connection between a printer and a mobile apparatus; and
   transmitting content displayed on the mobile apparatus to the printer without receiving a user command to print the content displayed after the wireless connection between the mobile apparatus and the printer is established.

9. The method of claim 8, wherein the content is at least one of an image, a picture, a photo, information regarding music being played, schedule information, and address book information.

10. The method of claim 8, wherein the content is displayed full-screen on the mobile apparatus.

11. A computer program product for a non-transitory computer-readable medium storing instructions executable by a processor of a mobile apparatus to cause the mobile apparatus to perform a method comprising:
   establishing a wireless connection between a printer and a mobile apparatus; and
   transmitting content displayed on the mobile apparatus to the printer without receiving a user command to print the content displayed after the wireless connection between the mobile apparatus and the printer is established.

12. The computer program product for the non-transitory computer-readable medium of claim 11, wherein the content is at least one of an image, a picture, a photo, information regarding music being played, schedule information, and address book information.

13. The computer program product for the non-transitory computer-readable medium of claim 11, wherein the method further comprises displaying the content full screen on the mobile apparatus before establishing the wireless connection.

14. A method comprising:
   establishing a wireless connection between a printer and a mobile apparatus;
   transmitting content displayed on the mobile apparatus to the printer without receiving a user command to print the content displayed after the wireless connection between the mobile apparatus and the printer is established; and
   printing the content transmitted by the mobile apparatus.

15. The method of claim 14, wherein the printing the content transmitted by the mobile apparatus includes printing based on an orientation of the mobile apparatus relative to the printer.

16. The method of claim 14, wherein the printing the content transmitted by the mobile apparatus includes printing based on function determined by a location of the mobile apparatus relative to the printer.

17. A system comprising:
   a computer program product for a non-transitory computer-readable medium storing instructions executable by a processor of a mobile apparatus to cause the mobile apparatus to perform a method comprising:
      establishing a wireless connection between a printer and the mobile apparatus; and
      transmitting content displayed on the mobile apparatus to the printer without receiving a user command to print the content displayed after the wireless connection between the mobile apparatus and the printer is established; and a printer configured to perform a method comprising:
      receiving the content transmitted by the mobile apparatus; and
      printing the received content.

18. The system of claim 17, wherein the computer program product is stored in the mobile apparatus.

19. The system of claim 17, wherein the computer program product is executed in the mobile apparatus.

20. The system of claim 17, wherein the content comprises at least one of an image, a picture, a photo, information regarding music being played, schedule information, and address book information.

21. The system of claim 17, wherein the printing the content received from the mobile apparatus includes printing based on an orientation of the mobile apparatus relative to the printer.

22. The system of claim 17, wherein the printing the content received from the mobile apparatus includes printing based on a function determined by a location of the mobile apparatus relative to the printer.

* * * * *